No. 774,607. PATENTED NOV. 8, 1904.
R. G. SCHMITT.
MANUFACTURE OF OBJECTS OF PAPIER MÂCHÉ.
APPLICATION FILED DEC. 5, 1903.
NO MODEL.

Witnesses
James L. Norris, Jr.
Ch. D. Kesler

Inventor
Rudolf G. Schmitt
By James L. Norris.
Atty

No. 774,607. Patented November 8, 1904.

UNITED STATES PATENT OFFICE.

RUDOLF GEORG SCHMITT, OF MUNICH, GERMANY.

MANUFACTURE OF OBJECTS OF PAPIER-MÂCHÉ.

SPECIFICATION forming part of Letters Patent No. 774,607, dated November 8, 1904.

Application filed December 5, 1903. Serial No. 183,963. (No model.)

*To all whom it may concern:*

Be it known that I, RUDOLF GEORG SCHMITT, engineer, a subject of the German Emperor, residing at 50 Plingauserstrasse, Munich, Kingdom of Bavaria, in the Empire of Germany, have invented an Improved Manufacture of Objects of Papier-Mâché, of which the following is a specification.

This invention relates to an improved manufacture of objects of papier-mâché--such as reliefs, friezes, figures, ornaments, figured wall-coverings, and the like—whereby such objects are produced in a cheaper and more simple manner than heretofore, the drying of the objects being effected more rapidly and the relief ornamentations produced being capable of being rolled up off the molds.

The invention is mainly based upon the employment of the short-fibered waste pulp obtained in the manufacture of paper, cellulose, wood-pulp, and the like.

The existing processes of manufacture are mainly carried out in such manner that a number of different layers of a paste-like paper material containing a large amount of water, such as is used for paper-making, are applied consecutively to the figured mold, the latter being composed either of glue, gelatin, gypsum, sulfur, or of metals and the like. The excess of water contained in the paper material was then removed by pressure and absorbed by a felt-like material.

To more clearly illustrate the manner of carrying out the method, as well as the article produced by the method, reference is had to the accompanying drawings, in which—

Figure 1:
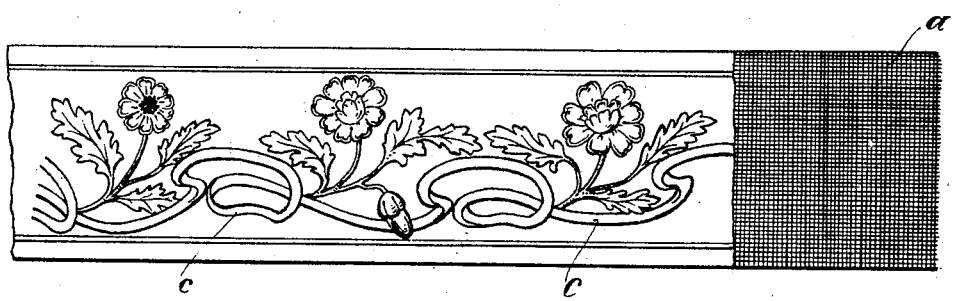
Figure 2:
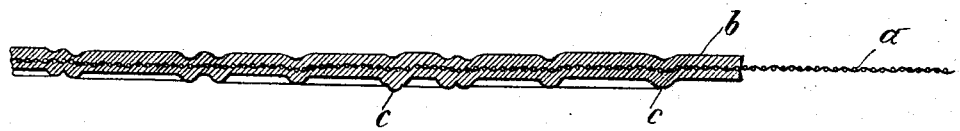

Figure 1 is an elevation, broken away, of a papier-mâché object made in accordance with this invention, and Fig. 2 is a longitudinal sectional view thereof.

Referring to the drawings, *a* denotes a woven fabric, such as canvas, *b* the plastic mass, and *c* the configuration.

According to one mode of carrying out the present invention the mold or the model to be copied is covered by a woven fabric, such as canvas, which in consequence of its flexibility applies itself closely against the surface of the mold or pattern, and upon this is spread a thin layer of the said waste pulp by means of brushes. The plastic mass in consequence of its shortness of fiber penetrates through the meshes of the fabric, so that this is more or less embedded in the mass. The woven fabric serves at the same time the purpose of absorbing the moisture contained in the plastic material. This takes place so rapidly that already after a few minutes the mass can be rolled up from the mold or model. The copy thus obtained reproduces accurately and with great sharpness the contours of the mold or model and is so flexible that it can be coiled up into rolls. In consequence of the use of the insertion of woven fabric the mass can be made very thin without detriment to its strength.

In order to reproduce relief objects as accurately as possible, it is essential to employ a material the structure of which enables it to penetrate into the sharpest and finest recesses of the mold's surface, and it has been found that the said waste material from paper-mills is above all most suitable for the purpose. This material, however, on account of the shortness of its fiber does not possess the requisite felting property to allow it to be used alone for the purpose in question, in particular when the objects are made of a thin layer, as it does not afford the requisite strength or cohesion. In addition the plastic mass formed of this short-fibered material is brittle. It is therefore employed either in combination with the before-mentioned woven fabric, which affords it the necessary strength and leather-like flexibility, or in lieu of the fabric the layer of waste material may be strengthened by the combination therewith of a more strongly-felting material—such as paper material, hair, &c.—in the form of a paste applied thereto by a brush or as a continuous layer. By this means the process is simplified and cheapened. The manufacture is carried out in such a manner that, for instance, a thin layer of the pulp or short-fibered waste material is applied to the mold or model in order to reproduce the sharp contours thereof, and upon this is laid a layer of pulp of longer-fibered material which becomes felted into the first layer and in drying affords it the requisite strength and flexibility, or according to another modification after applying the layer of short-fibered material a layer of paper is applied thereto which by its contact with the first layer becomes moist, and consequently very flexible, so as to apply itself closely to the contours of the first layer and to adhere firmly thereto. After the drying and hardening of the mass it can be drawn off the mold and rolled up.

In place of employing the paper-pulp for producing a felted layer a formed layer of paper felt may be used.

In many cases it is desirable in order to increase the flexibility of the manufactured article or its resistence to fire to employ as backing to the first layer that reproduces the design a layer of a different kind of felting material, such as fibers of animal, vegetable, or mineral origin, (cocoanut fiber, asbestos, &c.) These materials will always felt intimately together with the moist first layer of short-fibered material that reproduces accurately the configuration of the mold.

Having now particularly described and ascertained the nature of my said invention and in what manner the same is to be performed, I declare that what I claim is—

1. A method of manufacturing articles of papier-mâché which consists in applying a layer of an absorbent fabric upon the configuration to be produced, and then applying a layer of plastic material to said absorbent layer, said pulp penetrating said fabric and when dried reproducing said configuration.

2. A method of manufacturing articles of papier-mâché which consists in applying a layer of a woven fabric upon the configuration to be reproduced, and then applying a layer of short-fibered waste pulp to said fabric, said pulp penetrating said fabric and when dried reproducing said configuration.

3. As a new article of manufacture, an object of papier-mâché comprising in its construction short-fibered waste pulp.

4. As a new article of manufacture, an object of papier-mâché comprising in its construction short-fibered waste pulp, and means for imparting a felting property to the pulp.

5. As a new article of manufacture, an object of papier-mâché comprising in its construction short-fibered waste pulp, and a fabric for imparting a felting property to said pulp.

6. As a new article of manufacture, an object of papier-mâché comprising in its construction short-fibered waste pulp, and a canvas material for imparting a felting property to said pulp.

In witness whereof I have hereunto set my hand in presence of two witnesses.

RUDOLF GEORG SCHMITT.

Witnesses:
 CARL GAERTNER,
 ABRAHAM SCHLESINGER.